United States Patent
Mayer et al.

(10) Patent No.: US 9,427,699 B2
(45) Date of Patent: Aug. 30, 2016

(54) HOLLOW FIBER MODULE OF A DEVICE FOR SEPARATING FLUIDS AND METHOD FOR PRODUCING SAME

(71) Applicant: MANN+HUMMEL GMBH, Ludwigsburg (DE)

(72) Inventors: Marcel Mayer, Stuttgart (DE); Michael Fasold, Auenwald (DE); Hans-Werner Roesler, Essen (DE); Ines Bettermann, Duisburg (DE)

( * ) Notice: Subject to any disclaimer, the term of this patent is extended or adjusted under 35 U.S.C. 154(b) by 23 days.

(21) Appl. No.: 14/518,656

(22) Filed: Oct. 20, 2014

(65) Prior Publication Data

US 2015/0107455 A1 Apr. 23, 2015

(30) Foreign Application Priority Data

Oct. 21, 2013 (DE) .................. 10 2013 017 375

(51) Int. Cl.
*B01D 53/22* (2006.01)
*B01D 63/02* (2006.01)
*H01M 8/04* (2016.01)

(52) U.S. Cl.
CPC ............... *B01D 53/22* (2013.01); *B01D 63/02* (2013.01); *B01D 63/021* (2013.01); *H01M 8/04149* (2013.01); *B01D 2053/224* (2013.01); *B01D 2313/02* (2013.01); *B01D 2313/14* (2013.01); *B01D 2313/23* (2013.01); *Y02E 60/50* (2013.01); *Y10T 29/49801* (2015.01)

(58) Field of Classification Search
CPC B01D 53/22; B01D 2053/224; B01D 63/02; B01D 63/021; B01D 2313/02; B01D 2313/14; B01D 2313/23; H01M 8/04149
USPC .............................................................. 96/8
See application file for complete search history.

(56) References Cited

U.S. PATENT DOCUMENTS

| 3,557,962 | A | * | 1/1971 | Kohl | B01D 63/02 210/321.88 |
|---|---|---|---|---|---|
| 3,704,223 | A | | 11/1972 | Dietzsch | |
| 4,293,418 | A | * | 10/1981 | Fujii | B01D 53/22 96/8 |
| 5,141,031 | A | * | 8/1992 | Baurmeister | B01D 63/02 139/383 R |
| 5,236,665 | A | * | 8/1993 | Mathewson | B01D 63/02 95/46 |
| 5,779,897 | A | * | 7/1998 | Kalthod | B01D 53/22 96/8 |
| 2009/0115078 | A1 | | 5/2009 | Leister | |
| 2011/0308707 | A1 | * | 12/2011 | Montoya | B01D 63/021 156/155 |
| 2012/0151890 | A1 | * | 6/2012 | Pearson | B01D 63/02 55/484 |
| 2012/0304862 | A1 | * | 12/2012 | Taylor | B01D 63/02 96/8 |
| 2015/0265972 | A1 | * | 9/2015 | Roesink | B01D 63/06 210/323.2 |

FOREIGN PATENT DOCUMENTS

| DE | 4322278 A1 | | 1/1995 | |
|---|---|---|---|---|
| DE | 4422278 A1 | * | 1/1995 | ............ B01D 63/02 |
| DE | 10332493 A1 | * | 2/2005 | ............ B01D 53/22 |
| EP | 0082185 B1 | | 9/1987 | |

* cited by examiner

*Primary Examiner* — Jason M Greene
(74) *Attorney, Agent, or Firm* — James Hasselbeck

(57) ABSTRACT

A hollow fiber module of a device for separating fluids has hollow fibers with walls that have partially permeable structures. The hollow fibers are positioned parallel to each other. At least one areal fluid-permeable spacer medium with a structure that is self-supporting an areal state of the at least one spacer medium is provided and arranged between the hollow fibers such that the at least one spacer medium surrounds at least partially circumferentially a first one of two neighboring hollow fibers at least on a side of the first hollow fiber that is facing the second one of the two neighboring hollow fibers.

16 Claims, 5 Drawing Sheets

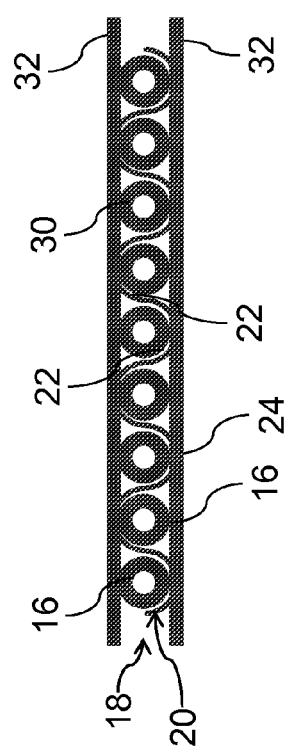
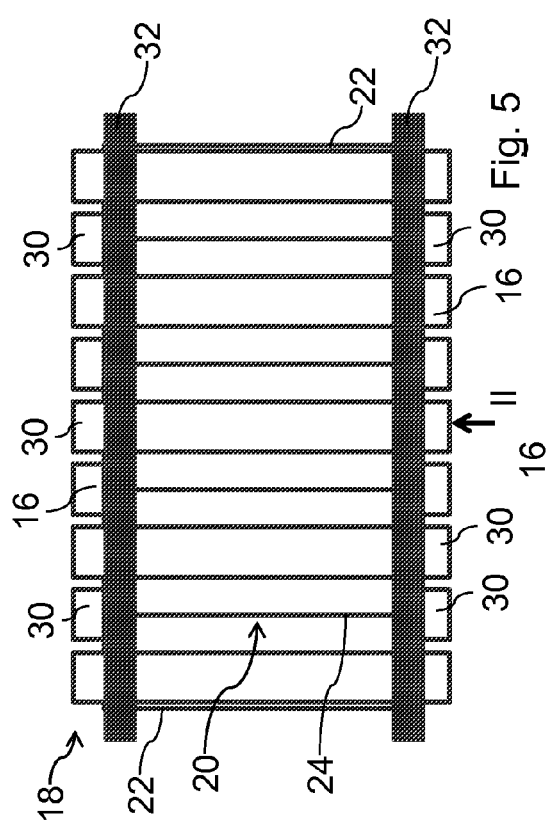
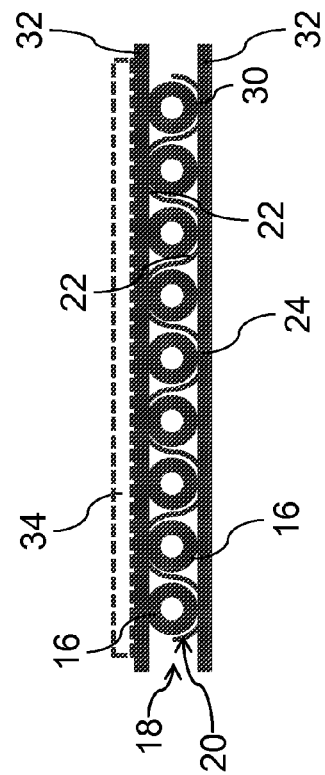
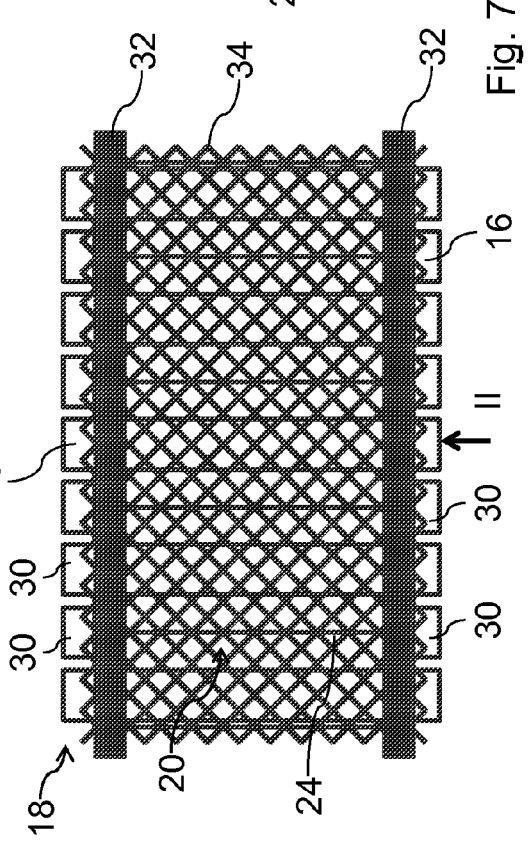

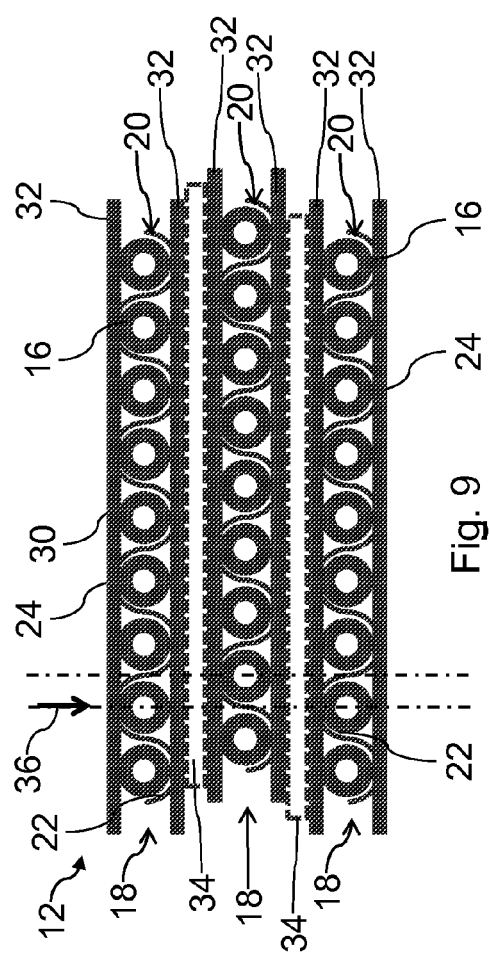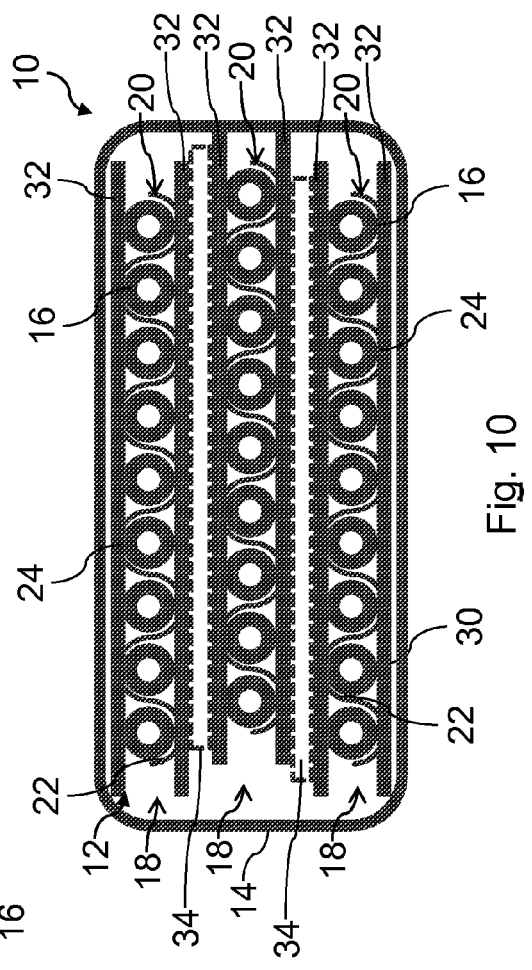

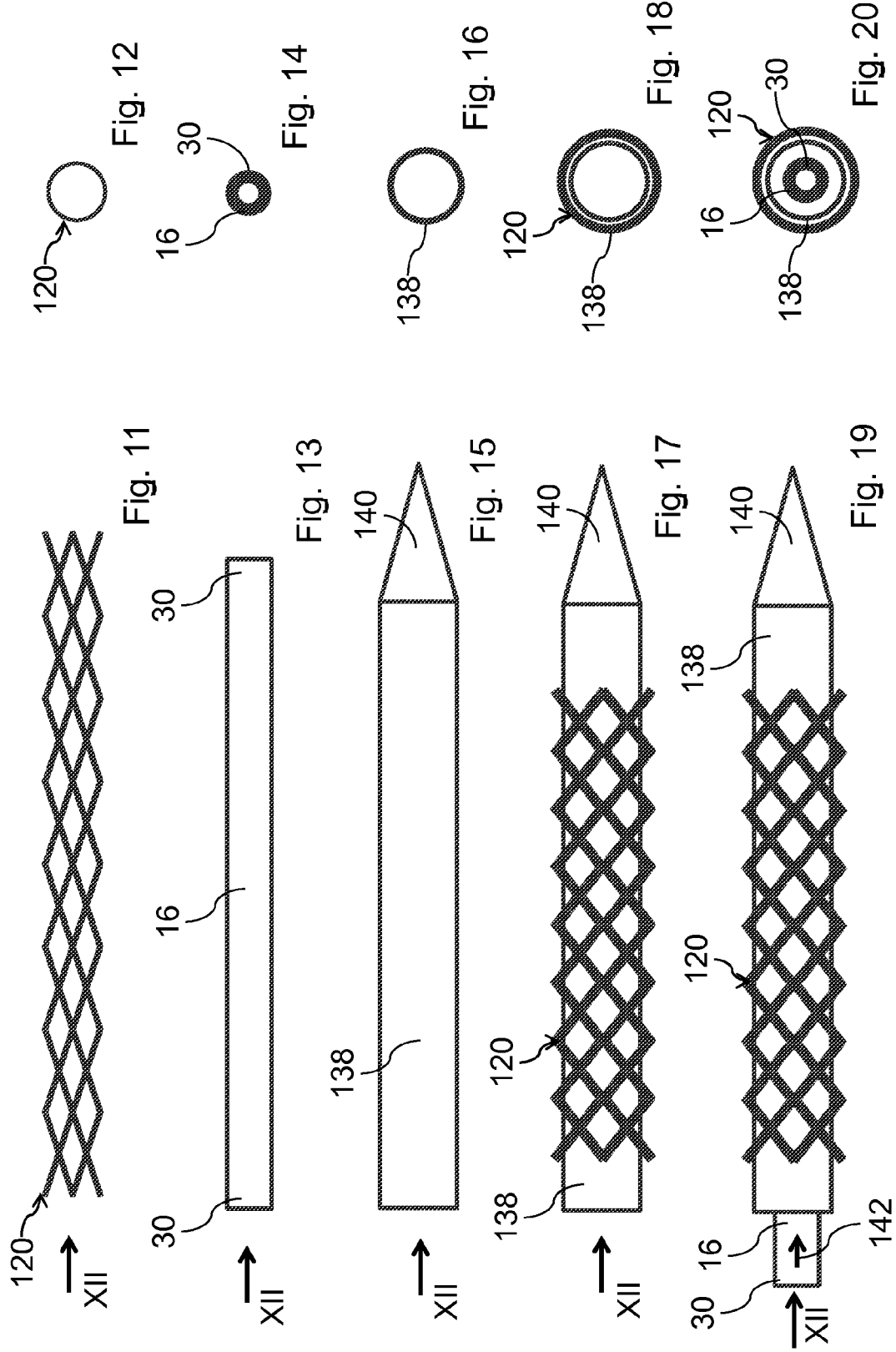

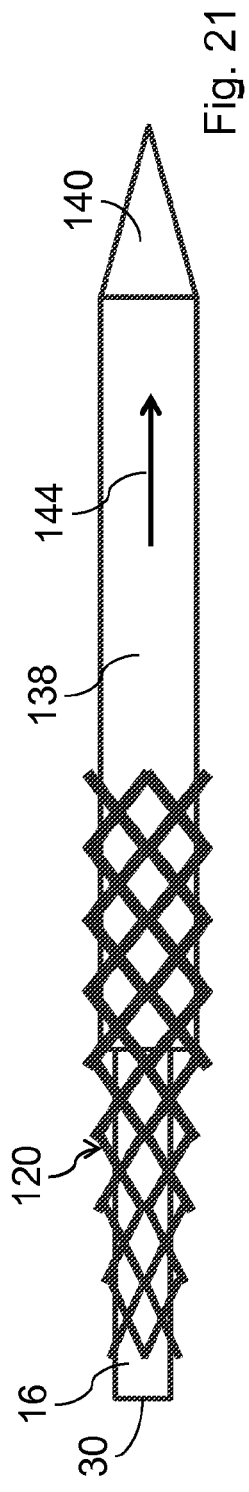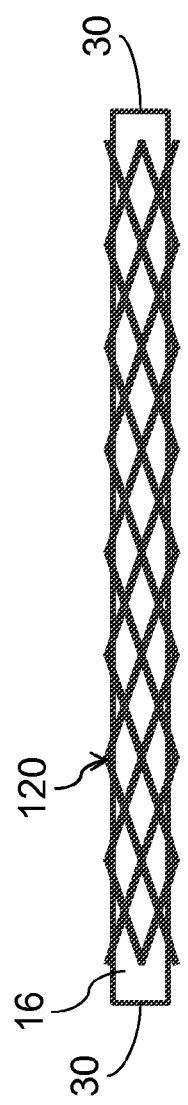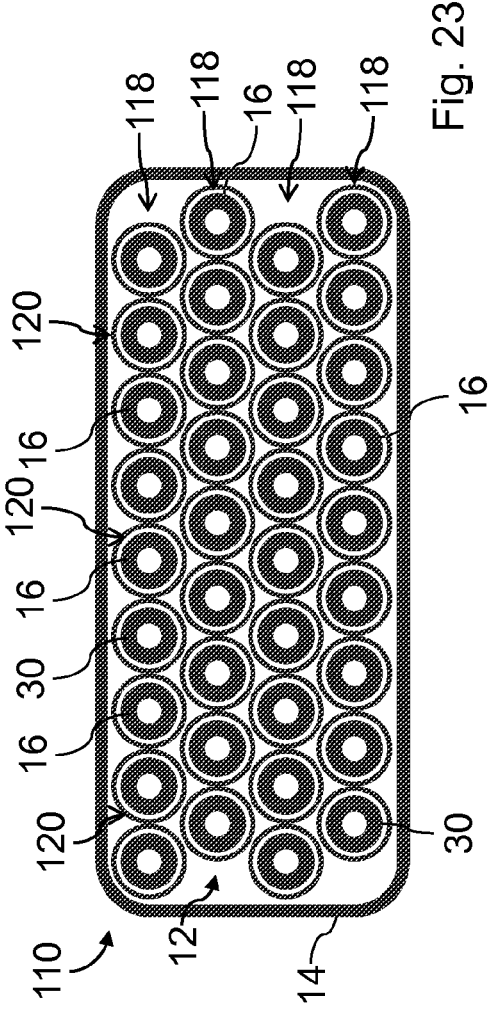

HOLLOW FIBER MODULE OF A DEVICE FOR SEPARATING FLUIDS AND METHOD FOR PRODUCING SAME

BACKGROUND OF THE INVENTION

The invention concerns a hollow fiber module of a device for separating fluids, in particular of an air humidifier, in particular for a fuel cell arrangement, comprising a plurality of hollow fibers whose walls are comprised of partially permeable structures, that extend side by side, and between which at least one areal fluid-permeable spacer medium is arranged that has a structure that is self-supporting its areal state.

Moreover, the invention concerns a method for producing a hollow fiber module, in particular a hollow fiber module according to the invention, of a device for separating fluids, in particular of an air humidifier, in particular for a fuel cell arrangement, wherein a plurality of hollow fibers whose walls are comprised of partially permeable structures are arranged side by side and between them at least one areal fluid-permeable spacer medium is arranged that has a structure that is self-supporting its areal state.

US 2009/0111578 A1 discloses an arrangement of hollow fibers that is particularly well suited for a humidifier of fuel cells. The hollow fiber arrangement is comprised of hollow fibers which are permeable for water vapor. In this context, a first air flow can be guided within the hollow fibers and a second air flow can be guided outside of the hollow fibers. The hollow fibers are held at a distance relative to each other by means of a device. The device has the shape of a flat web of nonwoven material which is arranged perpendicular to the second air flow. The web of nonwoven material is comprised of synthetic fibers which are connected to each other in such a way that the flow resistance is minimal. The device can instead also be comprised of an open-pore foam, in particular polyurethane foam. In the hollow fiber arrangement, hollow fibers which are located at the same side of the web of nonwoven material can contact each other.

The invention has the object to design a hollow fiber module and a method for producing a hollow fiber module in which each hollow fiber can be held at a spacing relative to a hollow fiber that is neighboring it.

SUMMARY OF THE INVENTION

This object is solved according to the invention in that the at least one spacer medium surrounds at least partially circumferentially at least one of two neighboring hollow fibers at least on the side that is facing the respective other hollow fiber.

According to the invention, all neighboring hollow fibers are therefore held at a spacing by means of at least one spacer medium. Advantageously, for all hollow fibers almost the same spacing can be provided. In this way, a uniform density of hollow fibers can be achieved across the hollow fiber module. Thus, a uniform flow passage and loading of the hollow fiber module can be enabled. In this way, it can be moreover avoided that, when introducing a fluid, areas of low fiber density are preferably flowed through by the fluid. It can be prevented in this way that areas of the hollow fiber module with higher fiber density are then flowed through to a lesser degree by the fluid and the fiber surface of the hollow fibers located thereat is not utilized. It can also be prevented in this way, in particular in case of a strong fluid flow transverse to the longitudinal axes of the hollow fibers, that the latter are not uniformly and reliably separated from each other and that the hollow fiber bundle is compacted. Alternatively, the spacing between neighboring hollow fibers can be varied. In this way, a flow distribution in the hollow fiber module can be varied.

The fluid to be separated can advantageously be a gaseous fluid. The gaseous fluid can have low viscosity. Advantageously, the gaseous fluid can be air that is saturated with water vapor. In this way, as air saturated with water vapor and having a high water contents passes through the hollow fiber module, it can be prevented that sticking together of the hollow fibers is promoted in case of a strong air flow. Accordingly, the reliability of the hollow fiber module, in particular when used in air humidifiers, in particular for fuel cell arrangements, can be increased.

Since at least one of two neighboring hollow fibers is at least partially surrounded circumferentially by the at least one spacer medium, the at least one spacer medium can prevent areally that the neighboring hollow fibers will come too close or even contact each other. In this way, even smallest contacts of neighboring hollow fibers can be prevented. Advantageously, the at least one spacer medium can extend across the entire length of the hollow fibers that is active for separation. Advantageously, the at least one spacer medium can extend at least across a fourth of the circumference of at least one of the two neighboring hollow fibers. In this way, a hollow fiber can be spaced apart with a single spacer medium relative to two neighboring hollow fibers. Preferably, the at least one spacer medium can extend across at least half of the circumference of at least one of the two neighboring hollow fibers. In this way, the two neighboring hollow fibers of this hollow fiber can be arranged in a common plane on opposed circumferential sides of this hollow fiber by means of the at least one spacer medium. Accordingly, the space requirement for the hollow fiber module can be further reduced.

The at least one spacer medium has a structure that is self-supporting its areal state. This means that the spacer medium, even without the hollow fibers, retains its areal state. In this context, the spacer medium can still be formable, in particular stretchable and/or bendable. The hollow fibers and the spacer medium can therefore be pre-fabricated separate from each other. It is not required that the hollow fibers are processed in any way, in particular woven, knitted, weft-knitted, stitched, braided, sewn or in any other way processed in a textile manner, together with other materials that form at least partially the at least one spacer medium. It is also not required that the hollow fiber exhibits a supporting and/or shaping function in order to maintain the areal state of the at least one spacer medium. In this way, mechanical and/or geometric demands on the hollow fibers can be reduced. Moreover, the manufacture of the hollow fibers and/or of the spacer medium can be simplified. Also, the arrangement of the hollow fibers relative to the at least one spacer medium can be simplified.

In a first particularly advantageous embodiment, the at least one areal spacer medium can be a corrugated or zigzag-shaped mat and the hollow fibers can be arranged alternatingly in corrugation valleys or fold valleys on the oppositely positioned sides of the mat. The hollow fibers can therefore be arranged respectively in a corrugation valley or fold valley and therefore be partially circumferentially surrounded by the at least one spacer medium. In this way, between two neighboring hollow fibers on one side of the mat, one hollow fiber can be positioned on the opposite side of the mat, respectively, and be located thereat in the corresponding corrugation valley or fold valley. Accordingly, the two neighboring hollow fibers on the same side, respectively, can be separated from each other by the hollow fiber on the opposite mat side and by the mat section surrounding it.

Advantageously, the mat, before inserting the hollow fibers, can already have been brought into the corrugated or zigzag-shaped form. Advantageously, the mat can be embossed. By means of embossing, the corrugation valleys or fold valleys can be realized in a simple way. The corrugation shape or fold shape can be realized also by folding the mat. Alternatively, the mat can be brought into the corrugated or zigzag-shaped form at the time of inserting the hollow fibers in a certain way.

Advantageously, the spacings of the corrugations or folds, their width and/or their depth can be uniform across the extension of the mat. In this way, the hollow fibers can be arranged uniformly across the mat. Advantageously, the depth of the corrugation valleys or the fold valleys may correspond to the outer diameter of the hollow fibers. In this way, the hollow fibers each can be surrounded across a wide area, at least across half of their circumference, by the at least one spacer medium. In this way, the hollow fibers can be arranged in a space-saving way in a common plane alternatingly on opposite sides of the mat. In this way, a planar layer of hollow fibers which are located in the corrugation valleys or fold valleys on opposite sides of the mat can be realized in a simple way.

Advantageously, a corrugation spacing or fold spacing can be between 3 mm and 6 mm, preferably approximately 4 mm. A corrugation height or fold height can be advantageously between 2.5 mm and 4.5 mm, preferably approximately 3.5 mm.

Advantageously, the course of the corrugation valleys or fold valleys at their valley bottom can correspond to the profile of the hollow fibers so that the hollow fibers each can snuggly fit areally in the corrugation valleys or the fold valleys.

Advantageously, the mat can be comprised of a material that is not woven, a so-called nonwoven material, in particular a fleece. When using the hollow fiber module for separation of a low-viscosity fluid, the nonwoven mat material, due to its backing-up effect, can cause a more uniform fluid flow. In this way, dead zones and unutilized filtration surfaces can be reduced, preferably prevented. The mat can also be comprised of a textile-like, in particular woven, weft-knitted, stitched, braided, sewn or knitted material.

Advantageously, the mat can have a great permeability for the fluid so that pressure losses occurring upon flow through the mat can be reduced.

Advantageously, the material of the mat can be flexible, in particular elastic, so that its shape can be adapted simply to the hollow fibers and/or to the shape of the future hollow fiber module. Also, with a flexible material possibly occurring vibrations, in particular operation-caused, in the hollow fiber module can be compensated in a simple way in order to prevent disturbances or destruction of the hollow fiber module.

In a further advantageous embodiment, the hollow fibers can be fixed on the mat by means of at least one fixation element, in particular at least one fixation element strip that is extending transverse to the corrugations or folds. With the at least one fixation element, the hollow fibers can be held in their position in the corrugation valleys or fold valleys. Thus, the mat can be preassembled with the hollow fibers in a simple way. Several mats with fixed hollow fibers can be combined in a simple way to a hollow fiber bundle. The hollow fiber bundle can be inserted simply into a module housing. With the at least one fixation element it can also be prevented that the hollow fibers in operation of the hollow fiber module can move within the corrugation valleys or move out of the corrugation valleys.

Advantageously, the at least one fixation element can comprise at least one fixation element strip that is extending transversely to the corrugations or folds and extends transversely across all hollow fibers on one side of the mat. In this way, with a single fixation element strip, all hollow fibers together can be fixed on one side of the mat. The at least one fixation element strip can be narrow in comparison to the mat extension so that it covers accordingly only little of the active fluid-permeable surface of the hollow fibers and of the mat.

Advantageously, the at least one fixation element can be realized by means of an adhesive, in particular a hot melt or silicone or stitching. In particular, stitching can extend transversely across all hollow fibers on one side of the mat. Adhesive can be applied in a simple way.

In a further advantageous embodiment, a plurality of hollow fiber layers of mats with hollow fibers can be arranged in a layered configuration. In this way, a multi-layer hollow fiber bundle can be realized in a simple way. The respective hollow fiber layers can be manufactured separate from each other. The pre-fabricated hollow fiber layers can be combined appropriately, depending on the required size of the hollow fiber module. In this way, depending on the number of hollow fiber layers, a separation capacity of the hollow fiber module can be predetermined in a simple and flexible way. Advantageously, the hollow fiber layers can be fixed on each other. For fixation of the hollow fiber layers, optionally the at least one fixation element, which has been used for fixation of the hollow fibers on the mats, can be used exclusively or at least can be partially used. In this way, the expenditure for separate means for connecting the hollow fiber layers can be reduced.

In a further advantageous embodiment, the mats can be arranged such that the hollow fibers of one hollow fiber layer, in a viewing direction perpendicular to a plane which is defined by the longitudinal axes of the hollow fibers, can be arranged between two hollow fibers of the respective neighboring hollow fiber layer. The hollow fiber layers can thus be arranged such that the hollow fibers of one hollow fiber layer are arranged in an intermediate space between the hollow fibers of the neighboring hollow fiber layer, respectively. In this way, the hollow fibers can be densely packed so that the packing size of the hollow fiber bundle can be correspondingly reduced.

In a further advantageous embodiment, between at least two neighboring hollow fiber layers of mats with hollow fibers and optionally fixation elements, at least one spacer element can be arranged, respectively. With the at least one spacer element, the neighboring hollow fiber layers can be held spaced apart relative to each other in a simple way. In this way, a uniform fluid flow can be further improved in the hollow fiber bundle. It can be prevented that the hollow fiber layers are positioned tightly on each other and thereby impair or even prevent the fluid flow.

The spacer element can advantageously comprise a grid. A grid can be arranged in a simple way between the hollow fiber layers. Advantageously, the grid can be a flat grid. In this way, the grid can rest flat and in a space-saving way an appropriate flat hollow fiber layers of mats with hollow fibers.

The at least one spacer element can advantageously be fixed on one of the hollow fiber layers of mats with hollow fibers, in particular can be glued thereto. Accordingly, the stability of the hollow fiber bundle can be further improved.

Advantageously, the at least one spacer element can be fixed by means of the at least one fixation element on the mat and/or the hollow fibers. In this way, the expenditure for separate fastening means can be reduced.

In a second particularly advantageous embodiment, at least some of the hollow fibers can be arranged in a spacer hose with a fluid-permeable circumferential wall. By means of the spacer hose the appropriate hollow fiber can be areally surrounded about the entire circumference and across the length of the spacer hose. In this way, this hollow fiber can be held at a spacing relative to all neighboring hollow fibers across the length of the spacer hose.

Advantageously, each of the hollow fibers can be surrounded by a spacer hose. In this way, it is not required to pay attention to a sequence of arrangement of the hollow fibers with and without spacer hose. In case that not all hollow fibers are provided with their own spacer hose, the hollow fibers with spacer hose can be arranged in the hollow fiber module alternatingly with hollow fibers without spacer hose in order to prevent that neighboring hollow fibers can contact each other.

The spacer hose can advantageously be a textile hose, preferably a woven hose or a hose of a foam material. The spacer hose has a structure that is self-supporting its areal state. The areal state is preferably the basis of a sleeve shape or cylinder shape. Even without the hollow fiber the spacer hose maintains the characteristic state of a hose in that the hose wall surrounds, circumferentially closed, an interior. In this context, the spacer hose without the hollow fiber may also be compressed to a flat state so that the volume of the interior is appropriately reduced. However, this does not change the fact that it maintains its hose state.

The spacer hose can advantageously be comprised of a material that is very permeable for the fluid. In this way, an impairment of the fluid flow can be reduced appropriately. Moreover, the spacer hose can be of a flexible material so that it can be easily adapted to the shape of the hollow fiber. Advantageously, the spacer hose can be made of polyphenylene sulfide (PPS).

The spacer hose in a round shape can advantageously have an outer diameter of 2 mm to 7 mm, preferably between 2.4 mm and 6.4 mm, preferably approximately 3.2 mm. Advantageously, the inner diameter of the spacer hose can be reduced such that it matches approximately the outer diameter of the hollow fiber. In this way, the spacer hose can be resting tightly against the hollow fiber. Advantageously, the spacer hose can be stretchable so that the introduction of the hollow fiber into the spacer hose can be simplified. The stretchability of the spacer hose can be related to the material and/or processing In a further advantageous embodiment, the hollow fibers can project with at least one fiber end, preferably both fiber ends, past the at least one spacer medium. In this way, on the at least one projecting fiber end a connector for a fluid connection can be realized in a simple way. When using a mat with corrugation valleys or fold valleys, the fiber ends can project past the corresponding side of the mat. When using spacer hoses, the fiber ends can project from the respective spacer hose.

Advantageously, the hollow fibers can be plugged at the fiber ends. For this purpose, in particular epoxy, hot wax or hot melt can be used. Advantageously, the fiber ends of the hollow fibers can be attached in a module housing of the hollow fiber module to a connecting device, in particular by potting. For this purpose, they can be potted in particular by stand casting or by centrifugal casting.

The technical object is further solved with the method in accordance with the invention in that the at least one spacer medium relative to the hollow fibers is arranged such that it at least partially surrounds circumferentially at least one of two neighboring hollow fibers at least on the side that is facing the respective other hollow fiber.

The advantages and features which have been discussed above in connection with the hollow fiber module according to the invention apply likewise to the method according to the invention and its advantageous embodiments, and vice versa.

According to the invention, at least some of the hollow fibers are arranged in or on at least one pre-fabricated spacer medium. The hollow fibers can thus be arranged such in a hollow fiber bundle that none of the hollow fibers is contacting a neighboring hollow fiber in an area that is active for fluid separation. Due to the separate manufacture of the at least one spacer medium it is not required that the hollow fibers have properties which are necessary so that they can be processed textile-like with other materials of the spacer medium, in particular woven, weft-knitted, stitched, knitted or braided. Moreover, it is not required for manufacturing the at least one spacer medium to pay attention that the sensitive hollow fibers are not bent or even destroyed. The manufacture of the at least one spacer medium can thus be simplified.

In a first particularly advantageous embodiment of the method, a mat can be corrugated or formed in a zigzag-shape for realizing the at least one areal spacer medium and the hollow fibers can be introduced into corrugation valleys or fold valleys on the opposite sides of the mat. The hollow fibers can be precisely positioned in the corrugation valleys or fold valleys. The flanks of the corrugation valleys or fold valleys can ensure in this context the spacing to the respective neighboring hollow fibers. With a uniform corrugation arrangement or fold arrangement, a uniform arrangement of the hollow fibers along the mat can be realized in a simple way. Shaping of the corrugations or folds can be realized advantageously by embossing or folding. Alternatively, the corrugation valleys or fold valleys can also be shaped upon introducing the hollow fibers.

In a further advantageous embodiment of the method, the hollow fibers can be fixed respectively by means of at least one fixation element on the mat, in particular, at least one fixation element strip can be arranged transversely to the corrugations or folds. In this way, a displacement or movement of the hollow fibers in the corrugation valleys or folds can be prevented. Advantageously, the hollow fibers can thus be pre-fabricated with the mats in a simple way as hollow fiber layers. The hollow fiber layers can then be combined later on to a hollow fiber bundle. Advantageously, an adhesive, in particular a hot melt or silicone, or stitching can be arranged transversely to the corrugations or folds. In this way, all hollow fibers together can be fixed in a simple way. In this way, the labor expenditure can be correspondingly reduced.

In a further advantageous embodiment of the method, a plurality of hollow fiber layers of mats with hollow fibers can be stacked to a hollow fiber bundle. Accordingly, the hollow fiber bundle and thus the hollow fiber module can be enlarged appropriately. In this way, the hollow fibers can be distributed in a simple way in a hollow fiber bundle. The pack size of the hollow fiber bundle can thus be improved.

Advantageously, the mats can be stacked such that the hollow fibers of one hollow fiber layer, in a viewing direction perpendicular to a plane that is defined by the longitudinal axes of the hollow fibers of this hollow fiber layer, can be arranged between two hollow fibers of the neighboring hollow fiber layer, respectively. In this way, the packing density of the hollow fibers in the hollow fiber bundle can be increased.

Advantageously, between at least two neighboring hollow fiber layers of mats with hollow fibers and optionally at least one fixation element, at least one spacer element can be arranged. In this way, the hollow fiber layers can be held at a particularly uniform spacing relative to each other.

The spacer element can advantageously be fixed on one of the hollow fiber layers of mats with hollow fibers, in particular glued thereto. Advantageously, for this purpose the at least one fixation element for fixation of the hollow fibers on the mat can be employed. Advantageously, the spacer element together with the hollow fiber layer of a mat with hollow fibers can be pre-fabricated, respectively. This hollow fiber layer can be connected with other hollow fiber layers of mats with hollow fibers and optionally respective spacer elements. In this way, the assembly expenditure can be reduced.

As spacer element advantageously a grid, in particular a flat grid, can be employed. A grid is fluid-permeable and enables in this way a fluid flow between the hollow fiber layers.

In a second particularly advantageous embodiment of the method, at least some of the hollow fibers can be arranged in a spacer hose with a fluid-permeable circumferential wall. The hollow fibers with spacer hoses can be pre-fabricated in a simple way. The hollow fibers with spacer hoses can be arranged in a simple way as hollow fiber bundles in a module housing of the hollow fiber module. Advantageously, all hollow fibers can be provided with a spacer hose, respectively. In this way, the arrangement in the module housing can be simplified. It is not necessary to pay attention to a certain sequence of hollow fibers with spacer hoses and hollow fibers without spacer hoses.

The spacer hose can advantageously be comprised of a textile material, preferably a fabric, or a foam material. Textile material, in particular fabric, has the advantage that it is stretchable in a simple way due to its processing. For this purpose, the textile material can be stretchable itself.

Advantageously, the spacer hose can first be pulled onto a mounting sleeve for arranging it on the hollow fibers and the hollow fiber can be inserted into the mounting sleeve. For simplifying mounting, the mounting sleeve can have a conically tapering tip with which it can be simply inserted into the spacer hose. Upon insertion of the mounting sleeve, the spacer hose can be expanded outwardly. The mounting sleeve can subsequently be pulled out of the spacer hose wherein the spacer hose is held on the hollow fiber. After removal of the mounting sleeve, the spacer hose can be reduced to a smaller diameter. Advantageously, the spacer hose can be reduced to the diameter of the hollow fiber so that it can rest snuggly on the radial outer circumferential side of the hollow fiber. In this way, a space-saving arrangement of the hollow fiber in the spacer hose can be realized.

The fiber ends of the hollow fibers can subsequently be plugged. Subsequently, the hollow fibers can be arranged in a hollow fiber bundle such that at least one of two neighboring hollow fibers is provided with a spacer hose.

In a further advantageous embodiment of the method, the hollow fibers can be arranged relative to the at least one spacer medium in such a way that they project past the at least one spacer medium at least at one fiber end, preferably at both fiber ends. The hollow fibers can be arranged in the corrugation valleys or fold valleys of the mat in such a way that they project past the mat at least with one fiber end, preferably with both fiber ends. In the alternative embodiment of the method, the spacer hose can be arranged on the appropriate hollow fiber such that the hollow fiber projects past the spacer hose at least with one fiber end, preferably with both fiber ends. After connection with the at least one spacer medium, the hollow fibers can be provided at the corresponding fiber ends with a fluid connector. Advantageously, the hollow fiber bundle with the corresponding fiber ends can be cast in, in particular potted.

BRIEF DESCRIPTION OF THE DRAWINGS

Further advantages, features, and details of the invention result from the following description in which embodiments of the invention will be explained in more detail with the aid of the drawing. A person of skill in the art will consider the features disclosed in combination in the drawing, the description, and the claims expediently also individually and combine them to other meaningful combinations.

FIGS. 1 to 10 illustrate in different manufacturing phases and perspectives a hollow fiber module of an air humidifier according to a first embodiment with a plurality of hollow fibers which are arranged in corrugated spacer mats.

FIG. 1 shows schematically a spacer mat with corrugation valleys and corrugation peaks.

FIG. 2 shows schematically a spacer mat in a side view illustrating corrugation valleys and corrugation peaks, indicating the corrugation height and corrugation spacing.

FIG. 3 shows schematically a spacer mat in plan view with hollow fibers positioned in the corrugation valleys.

FIG. 4 shows schematically the spacer mat of FIG. 3 in a side view to illustrate the arrangement of the hollow fibers.

FIG. 5 shows the spacer mat with hollow fibers fixed by fixation element strips.

FIG. 6 shows schematically the spacer mat of FIG. 5 in a side view to illustrate the arrangement of the hollow fibers and fixation element strips.

FIG. 7 shows the spacer mat with hollow fibers fixed by fixation element strips and with a separation grid placed on top.

FIG. 8 shows schematically the spacer mat of FIG. 7 in a side view to illustrate the arrangement of the hollow fibers, fixation element strips, and separation grid.

FIG. 9 shows a hollow fiber bundle comprising a layered arrangement of hollow fibers and corrugated mats produced as shown in FIGS. 1 to 8.

FIG. 10 shows a hollow fiber module of an air humidifier comprising the arrangement of hollow fibers and corrugated spacer mats produced as shown in FIGS. 1 to 9.

FIGS. 11 to 23 illustrate in different manufacturing phases and perspectives a hollow fiber module of an air humidifier according to a second embodiment with a plurality of hollow fibers which are arranged each in a fabric hose.

FIG. 11 schematically illustrates a spacer hose in a side view.

FIG. 12 shows an end view of the spacer hose in the viewing direction XII of FIG. 11.

FIG. 13 schematically illustrates a hollow fiber in a side view.

FIG. 14 shows an end view of the hollow fiber in the viewing direction XII of FIG. 13.

FIG. 15 schematically illustrates a mounting sleeve in a side view.

FIG. 16 shows an end view of the mounting sleeve in the viewing direction XII of FIG. 15.

FIG. 17 schematically illustrates a mounting sleeve inserted into a spacer hose in a side view.

FIG. 18 shows an end view of the mounting sleeve and spacer hose in the viewing direction XII of FIG. 17.

FIG. 19 schematically illustrates a hollow fiber inserted into the mounting sleeve with spacer hose in a side view.

FIG. 20 shows an end view of the arrangement of the hollow fiber inserted into the mounting sleeve with spacer hose in the viewing direction XII of FIG. 19.

FIG. 21 schematically illustrates removal of the mounting sleeve from the arrangement of FIG. 20 in a side view.

FIG. 22 schematically illustrates the spacer hose arranged on the hollow fiber.

FIG. 23 shows a hollow fiber module comprised of hollow fibers surrounded by spacer hoses produced as shown in FIGS. 11-22.

In the Figures, same components are provided with same reference characters.

DESCRIPTION OF PREFERRED EMBODIMENTS

Figure 1:
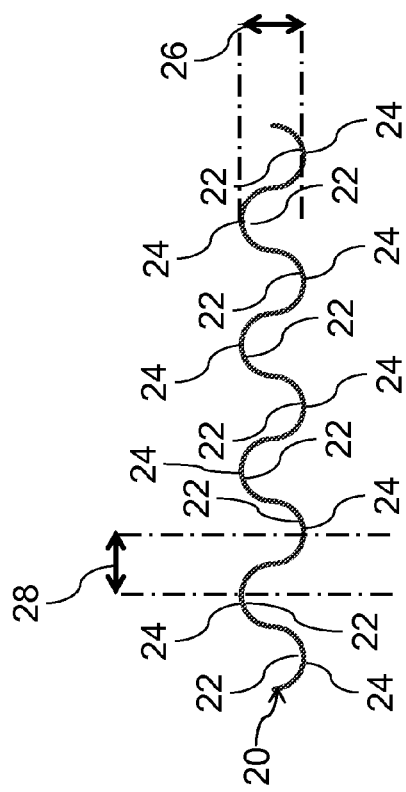

In FIGS. 1 to 10, a hollow fiber module 10 according to a first embodiment is shown in different manufacturing phases. FIG. 10 shows the hollow fiber module 10 open at its end face. The hollow fiber module 10 is part of an air humidifier of a fuel cell arrangement.

The hollow fiber module 10 comprises a hollow fiber bundle 12 of a layered configuration which is arranged in a module housing 14. The hollow fiber bundle 12 comprises a plurality of hollow fibers 16 which extend approximately parallel to each other. The hollow fibers 16 have walls of partially permeable structures. In operation, air that is saturated with water vapor flows against the hollow fibers 16. The water vapor passes through the partially permeable walls into the interior of the hollow fibers 16 and from there is conveyed to the fuel cells. The hollow fibers 16 are arranged in an exemplary fashion in three hollow fiber layers 18. Each hollow fiber layer 18 comprises in an exemplary fashion nine hollow fibers 16.

Moreover, each hollow fiber layer 18 comprises a corrugated spacer mat 20. The spacer mats 20 are comprised of a very open, flexible, nonwoven material. In the present embodiment, the spacer mats 20 are made of polypropylene (PP). The spacer mats 20 are permeable for air that is saturated with water vapor.

Figure 2:
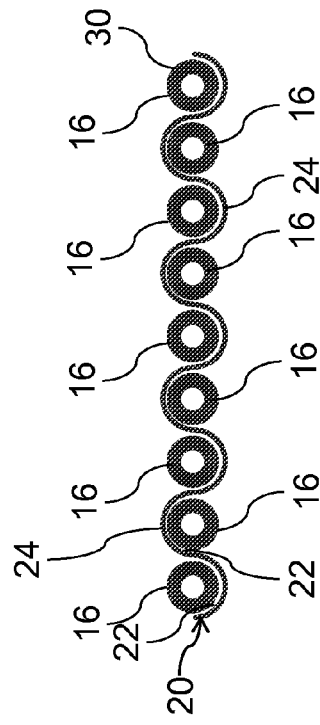

The spacer mats 20 have uniform parallel extending corrugations. The corrugations are realized by means of embossing. The corrugations form on opposite sides of the spacer mats 20 corrugation valleys 22 and corrugations peaks 24, respectively. A height of the corrugations, i.e., the depth of the corrugation valleys 24, is indicated in FIG. 2 by a double arrow 26. The corrugation height 24 is preferably approximately 3.5 mm. A corrugation spacing, indicated in FIGS. 1 and 2 by a double arrow 28, respectively, between a corrugation valley 22 and a corrugation peak 24 on one side of the spacer mat 20, i.e., the width of the corrugation valleys 22, is approximately 4 mm.

Figure 3:
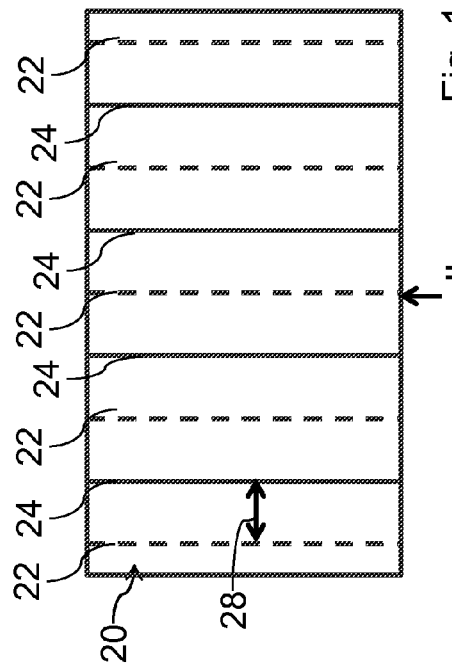

The hollow fibers 16 of a hollow fiber layer 18 are arranged each in the corrugation valleys 22 on opposite sides of the spacer mat 20. The outer diameter of the hollow fibers 16 corresponds approximately to the corrugation height 26 so that, as a whole, the hollow fibers 16, viewed radially relative to their longitudinal axes, can be immersed completely in the corrugation valleys 22. The longitudinal axes of the hollow fibers 16 of one hollow fiber layer 18 are arranged in one plane. Due to the alternating arrangement of the hollow fibers 16 on opposite sides, the spacer mat 20 separates neighboring hollow fibers 16, respectively, and holds them at a uniform spacing. As shown in FIGS. 3, 5, and 7, the hollow fibers 16 project with their two fiber ends 38 past the spacer mat 20 at oppositely positioned transverse edges.

In the area of each transverse edge of the spacer mat 20, the hollow fibers 16 are each fixed by means of a fixation strip 32 on the respective side of the spacer mat 20. The fixation strips 32 are comprised of a hot melt. The fixation strips 32 extend on the corresponding side of the spacer mat 20 perpendicular to the longitudinal axis of the hollow fibers 16 transversely across all hollow fibers 16.

The two lower hollow fiber layers 18 in FIGS. 9 and 10 each have a flat separation grid 34. The separation grids 34 extend across the entire transverse extension of the spacer mat 20 in a plane that extends parallel to the plane defined by the longitudinal axes of the hollow fibers 16. At their transverse edges the fiber ends 30 of the hollow fibers 16 can project past the separation grids 34. The separation grids 34 are glued to the fixation strips 32, respectively, and in this way attached fixedly on the spacer mat 20 of the corresponding hollow fiber layer 18. In the hollow fiber bundle 12, the separation grids 34 are located between two of the spacer mats 20 with hollow fibers 16, respectively, so that they are separated from each other. The separation grids 34 are permeable for air that is saturated with water vapor.

In the hollow fiber bundle 12 the layers 16 are arranged such that the hollow fibers 16 of one hollow fiber layer 18, in a viewing direction perpendicular to the longitudinal axes of the hollow fibers 16, are arranged between two hollow fibers 16 of the respective neighboring hollow fiber layer 18. The viewing direction is indicated in FIG. 9 by means of arrow 36 and dashed lines. In this way, the hollow fibers 16 as a whole are densely packed. A layer sequence A-B-A is realized. The hollow fibers 16, the corrugation valleys 22, and the corrugation peaks 24 of the two outer hollow fiber layers 18, in FIGS. 9 and 10 at the top and at the bottom, which each form a layer A, are aligned in the viewing direction 36. The central hollow fiber layer 18 which forms the B layer is displaced relative to the two outer hollow fiber layers 18 by corrugation spacing 28 perpendicular to the longitudinal axes of the hollow fibers 16.

For producing the hollow fiber module 10, the spacer mats 20 and the hollow fibers 16 are produced separate from each other. The spacer mats 20 each have a structure which maintains its areal state by itself and without the hollow fibers 16. The corrugations are embossed into the spacer mats 20. One of the corrugated spacer mats 20 is shown in FIG. 1 in a plan view. FIG. 2 shows the spacer mat 20 of FIG. 1 in a side view in the viewing direction II indicated thereat.

Figure 4:
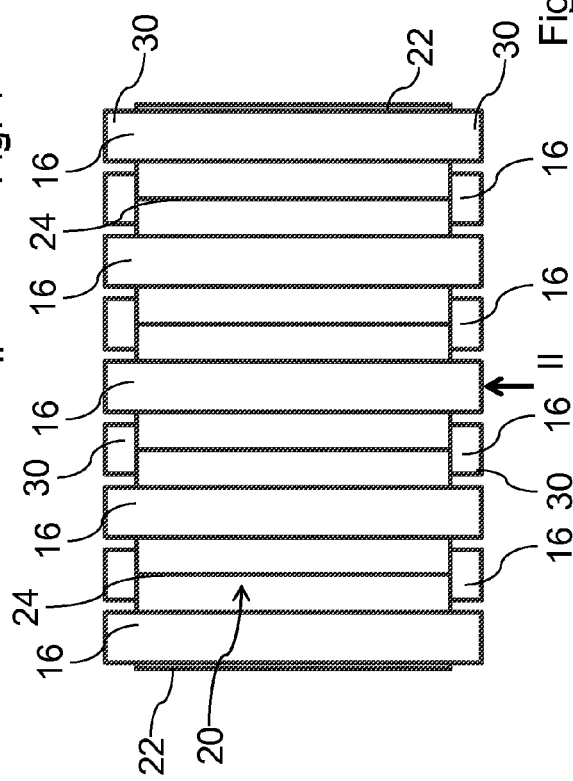

The hollow fibers 16 are placed on both sides of the spacer mats 20 into the corrugation valleys 20. This is illustrated in FIGS. 3 and 4. The viewing direction II of the side view is pointing in the direction of the longitudinal axes of the hollow fibers 16.

On both sides of the spacer mats 20, the fixation strips 32 are arranged and in this way the hollow fibers 16 are fixed in the corrugation valleys 22. For two of the spacer mats 20, the respective separation grid 34 is placed onto one side of the spacer mat 20 and glued to the fixation strip 32. This is illustrated in FIGS. 7 and 8.

The pre-fabricated hollow fiber layers 18, as shown in FIG. 9 in a side view, are stacked in a layer sequence A-B-A staggered relative to each other. In this context, a separation grid 34 is provided between two neighboring hollow fiber layers 18, respectively.

The thus formed hollow fiber bundle 12 is introduced into a module housing 14. The hollow fiber module 10, open at the end face, is shown in the side view in FIG. 10.

The fiber ends 30 of the hollow fibers 16 are plugged, for example, by means of epoxy or hot melt. Then the hollow fibers 16 are potted at the fiber ends 30 in a way not of interest in this context. After potting, the fiber ends 30 of the hollow fibers 16 are uncovered at both end faces of the hollow fiber module 10.

In FIGS. 11 to 23, a hollow fiber module 110 according to a second embodiment is shown in various manufacturing phases. FIG. 23 shows the hollow fiber module 110 open at the end face. In contrast to the first embodiment of FIGS. 1 to 10, in the second embodiment spacer hoses 120 are provided in place of the spacer mats 20 in order to hold the neighboring hollow fibers 16 at a spacing to each other. Each hollow fiber 16 is surrounded by a spacer hose 120.

One of the spacer hoses 120 is illustrated in FIG. 11 in a side view. In FIG. 12 the spacer hose 120 of FIG. 11 is illustrated in an axial view with indicated viewing direction XII. The viewing direction XII also applies to the axial views of FIGS. 14, 16, 18, 20, and 23. The spacer hoses 120 are fabric hoses. Fabric hoses have a structure that is self-supporting its areal state. Preferably, the spacer hoses 120 are made of polyphenylene sulfide (PPS). The diameter of the spacer hoses 120 in the unstretched state, as illustrated in FIGS. 11 and 12, is approximately 3.2 mm. In the unstretched state the diameters of the spacer hoses 120 correspond approximately to the outer diameter of the hollow fibers 16.

The hollow fibers 16, as shown in FIG. 23, are arranged in four layers with a layer sequence A-B-A-B. In this way, the hollow fibers 16 are densely packed. At least the inwardly arranged hollow fibers 16 of a hollow fiber layer 118 are located each in an intermediate space between two hollow fibers 16 of a neighboring hollow fiber layer 118.

In contrast to the first embodiment of FIGS. 1 to 10, in the second embodiment (FIGS. 11-23) the hollow fibers 16 of a hollow fiber layer 118 are not fixed on each other. Fixation strips 32 and separating grids 34, used in the first embodiment, can be eliminated. The spacer hoses 120 cover the hollow fibers 16 in the area between the two fiber ends 30 completely and without a gap, aside from the fluid-permeable mesh structure. In this way, neighboring hollow fibers 16 cannot contact each other at any location. Accordingly, a uniform spacing between all neighboring hollow fibers 16 can be realized.

For producing the hollow fiber module 110, the spacer hoses 120 and the hollow fibers 16 are produced separately.

The hollow fibers 16 are individually provided with a spacer hose 120, respectively. For this purpose, a mounting sleeve 138, as illustrated in FIGS. 15 and 16, is inserted in the direction of the longitudinal axis into the spacer hose 120. Upon insertion of the mounting sleeve 138, the spacer hose 120 is expanded. In order to simplify insertion of the mounting sleeve 138, the latter has a conically tapering tip 140. The mounting sleeve 138 has a hollow interior. Aside from its tip 140, a wall of the mounting sleeve 138 is straight and of circular cylindrical shape.

The radial inner diameter of the circular cylindrical section of the mounting sleeve 138 is greater than the radial outer diameter of the hollow fibers 16. The cylindrical section of the mounting sleeve 138 is longer than the length of the spacer hose 120 so that the latter can be completely arranged on the mounting sleeve 138, as shown in FIG. 17. FIG. 18 shows the axial view of the mounting sleeve 138 with the spacer hose 120.

A hollow fiber 16 is inserted in axial direction from the open side that is facing away from the tip 140 into the interior of the mounting sleeve 138. An insertion direction of the hollow fiber 16 is indicated in FIG. 19 by arrow 142. FIG. 20 shows the axial view of the mounting sleeve 138 with the spacer hose 120 and the hollow fiber 16.

Subsequently, the mounting sleeve 138, as indicated in FIG. 21 by arrow 144, is pulled out of the spacer hose 120. In doing so, the spacer hose 120 is held on the hollow fiber 16 so that it cannot slip in axial direction. The mounting sleeve 138 is thus removed at the same time from the hollow fiber 16. The spacer hose 120 is thus retracted to its original diameter and rests tightly on the radial outer circumferential side of the hollow fiber 16. One of the hollow fibers 16 with applied spacer hose 120 is shown in FIG. 22 in a side view. The hollow fibers 16 project past the respective spacer hose 120 with their two fiber ends 30.

Subsequently, the fiber ends 30, in analogy to the first embodiment, are plugged at both ends, for example, with epoxy or hot melt. The hollow fibers 16 with the spacer hoses 120 are introduced into the module housing 14 and layered as shown in FIG. 23. Subsequently, the fiber ends 30 of the hollow fibers 16 are potted at both sides. The potting material is then opened at both sides for exposing the fiber ends 30.

In all of the above described embodiments of a hollow fiber module 10; 110 and a method for producing the same, inter alia the following modifications are possible:

The invention is not limited to hollow fiber modules 10; 110 for air humidifiers of fuel cell arrangements. It can also be used for other types of air humidifiers or other types of devices for separating fluids.

In the first embodiment of the hollow fiber module 10, more or fewer than nine hollow fibers 16 per hollow fiber layer 18 may be provided also.

Also, it is possible to provide more or fewer than three hollow fiber layers 18.

The spacer mats 20, instead of being made of a nonwoven material, can also be made of a permeable textile-type material, for example, a woven, knitted, stitched, braided, weft-knitted material.

The spacer mats 20, instead of being corrugated, can also be folded in a zigzag shape.

The corrugation height 24 an also be smaller or greater than 3.5 mm. Preferably, it can be between 2.5 mm and 4.5 mm.

The corrugation spacing 28 can also be more or less than 4 mm. Preferably, it can be between 3 mm and 5 mm.

The spacer mat 20, instead of being made of polypropylene, can also be made of a different material.

The fixation strips 32, instead of being made of a hot melt, can also be made of a different type of adhesive, for example, on the basis of silicone, or can be realized by stitching.

The corrugations of the spacer mat 20, instead of being made by prior embossing, can also be realized by introducing the hollow fibers 16.

Instead of by means of potting, the hollow fibers 16 can also be provided in a different way with a connector.

In the second embodiment, the spacer hoses 120, instead of being fabric hoses, can also be realized by different types of hoses, even nonwoven hoses.

The spacer hoses 120, instead of being made of polyphenylene sulfide, can also be made of a different material.

The outer diameter of the spacer hoses 120 can also be more or less than 3.2 mm, for example, between 2 mm and 7 mm, preferably between 2.4 mm and 6.4 mm.

In the method according to the second embodiment, it is also possible to first insert the hollow fiber 16 into the mounting sleeve 138 and to subsequently insert the mounting sleeve 138 into the spacer hose 120. Insertion of the hollow fiber 16 into the mounting sleeve 138 and insertion of the mounting sleeve 138 into the spacer hose 120 can also be realized in a single working step.

In the second embodiment, more or fewer than four hollow fiber layers 118 can be provided also.

While specific embodiments of the invention have been shown and described in detail to illustrate the inventive principles, it will be understood that the invention may be embodied otherwise without departing from such principles.

What is claimed is:

1. A hollow fiber module of a device for separating fluids, the module comprising:
    hollow fibers comprising walls that are comprised of partially permeable structures, the hollow fibers positioned parallel to each other;
    at least one areal fluid-permeable spacer medium comprising a structure that is self-supporting an areal state of the at least one spacer medium;
    the at least one spacer medium arranged between the hollow fibers such that the at least one spacer medium surrounds at least partially circumferentially a first one of two neighboring hollow fibers at least on a side of said first hollow fiber that is facing the second one of the two neighboring hollow fibers;
    wherein a first spacer medium of the at least one spacer medium is an air permeable mat of open, flexible material;
    wherein the mat is corrugated to form a continuous corrugated mat having a plurality of alternating corrugation valleys and corrugation peaks, the corrugation valleys opening at a first side of the corrugated mat and the corrugation peaks opening at an opposing second side of the corrugated mat;
    wherein a first portion of the hollow fibers are arranged directly on the corrugated mat in corrugation valleys opening at the first side of the corrugated mat;
    wherein a second portion of the hollow fibers are arranged directly on the corrugated mat in immediately adjacent corrugation peaks opening in the opposing second side of the corrugated mat, such that individual ones of the hollow fibers are arranged alternatingly in the corrugation valleys and corrugation peaks at opposite sides of the corrugated mat to form a hollow fiber layer.

2. The hollow fiber module according to claim 1, further comprising
    at least one fixation element, wherein the hollow fibers are fixed on the mat by the at least one fixation element.

3. The hollow fiber module according to claim 2, wherein
    the at least one fixation element is a fixation element strip extending transversely to the corrugations;
    wherein the fixation element strip is arranged directly on and extending traversely to corrugation peaks, connecting adjacent corrugation peaks across interposed corrugation valleys;
    wherein the fixation element strip directly contacts hollow fibers arranged in the corrugation valleys between the corrugation peaks to fix the hollow fibers to the spacer medium.

4. The hollow fiber module according to claim 2, wherein several of said hollow fiber layer are arranged in a layered configuration.

5. The hollow fiber module according to claim 4, wherein the mats of said several hollow fiber layers are arranged such that the hollow fibers of a first one of said hollow fiber layers, in a viewing direction perpendicular to a plane defined by longitudinal axes of the hollow fibers of said first hollow fiber layer, are arranged between two hollow fibers, respectively, of a second one of said hollow fiber layers that is neighboring said first hollow fiber layer.

6. The hollow fiber module according to claim 4, further comprising
    a spacer element arranged at least between two of said hollow fiber layers that are neighboring each other.

7. The hollow fiber module according to claim 1, wherein several of said hollow fiber layer are arranged in a layered configuration.

8. The hollow fiber module according to claim 7, wherein the mats of said several hollow fiber layers are arranged such that the hollow fibers of a first one of said hollow fiber layers, in a viewing direction perpendicular to a plane defined by longitudinal axes of the hollow fibers of said first hollow fiber layer, are arranged between two hollow fibers, respectively, of a second one of said hollow fiber layers that is neighboring said first hollow fiber layer.

9. The hollow fiber module according to claim 7, further comprising
    a spacer element arranged at least between two of said hollow fiber layers that are neighboring each other.

10. A hollow fiber module of a device for separating fluids, the module comprising:
    hollow fibers comprising walls that are comprised of partially permeable structures, the hollow fibers positioned parallel to each other;
    at least one areal fluid-permeable spacer medium comprising a structure that is self-supporting an areal state of the at least one spacer medium;
    a plurality of spacer hoses of a woven textile material or a foam material, wherein the hollow fibers each are each arranged in a respective one of said plurality of spacer hoses, wherein said spacer hoses each comprise a fluid-permeable circumferential wall;
    wherein the hollow fibers are not fixed to each other;
    wherein contact of neighboring spacer hoses fixes spacing between neighboring hollow fibers;
    wherein the hollow fibers are separated from each other only by the spacer hoses and not by other separating elements or structures.

11. The hollow fiber module according to claim 1, wherein
    the hollow fibers project past the at least one spacer medium at least with one fiber end.

12. The hollow fiber module according to claim 1, wherein
    the hollow fibers have opposed fiber ends and the opposed fiber ends project past the at least one spacer medium.

13. A method for producing a hollow fiber module according to claim 1, comprising the steps of:
    providing hollow fibers having walls comprising partially permeable structures;
    forming a first hollow fiber layer by the steps of:
        providing an areal fluid-permeable mat of open, flexible material;
        producing a first spacer medium by corrugating the mat to form a continuous corrugated mat having a plurality of alternating corrugation valleys and corrugation peaks, the corrugation valleys opening at a first side of the corrugated mat and the corrugation peaks opening at an opposing second side of the corrugated mat;

arranging hollow fibers on the corrugated mat in corrugations opening at the first side of the corrugated mat;

arranging hollow fibers on the corrugated mat in corrugations opening at the opposing second side of the corrugated mat; and wherein the hollow fibers are arranged alternatingly in the corrugation valleys and corrugation peaks at opposite sides of the corrugated mat to form the first hollow fiber layer.

14. The method according to claim 13, further comprising forming a first fixation element strip extending traversely across corrugation peaks or valleys at the first or second side of the corrugated mat;

wherein the first fixation element strip extends traverse to the hollow fibers;

wherein the first fixation element strip directly contacts alternating hollow fibers, fixing the hollow fibers to the corrugated mat.

15. The method according to claim 13, further comprising:

forming at least one additional hollow fiber layer by repeating the steps of forming a first hollow fiber layer;

stacking the at least one additional hollow fiber layer onto the first hollow fiber layer to form a hollow fiber bundle.

16. The method according to claim 13, wherein the hollow fibers have opposed fiber ends and are arranged relative to the at least one spacer medium such that the hollow fibers project past the at least one spacer medium with at least one of the opposed fiber ends.

\* \* \* \* \*